Jan. 15, 1963

R. F. KUHN, JR 3,073,630

YOKE AND GIMBAL

Filed May 29, 1959

INVENTOR.
RALPH F. KUHN JR.

BY *Noel H. Conway*

ATTORNEY

Jan. 15, 1963 R. F. KUHN, JR 3,073,630
YOKE AND GIMBAL
Filed May 29, 1959 3 Sheets-Sheet 2

INVENTOR.
RALPH F. KUHN JR.
BY Noel H. Conway
ATTORNEY

Jan. 15, 1963   R. F. KUHN, JR   3,073,630
YOKE AND GIMBAL
Filed May 29, 1959   3 Sheets-Sheet 3

INVENTOR.
RALPH F. KUHN JR.
BY *Noel F. Conway*
ATTORNEY

United States Patent Office 3,073,630
Patented Jan. 15, 1963

3,073,630
YOKE AND GIMBAL
Ralph F. Kuhn, Jr., Studio City, Calif., assignor to
North American Aviation, Inc.
Filed May 29, 1959, Ser. No. 816,974
6 Claims. (Cl. 287—1)

This invention relates generally to gimbals and more particularly to a light weight universal rocket engine gimbal which will transfer large thrust from a rocket engine to a missile body.

There is a continuing need for larger and larger rocket engines in order to put larger and larger payloads into the sky and the space above. One major problem in conjunction with the use of larger rocket engines is that some means such as a universal gimbal must be provided in order to be able to vary the direction of the thrust of the rocket engine. Further, many times it is desired to use what is called a ring gimbal which has a hole through the center of it. This hole is particularly advantageous in that a short straight flexible propellant line may be installed extending through the hole which will carry more propellant to the rocket engine easier. Until this time, the engineers have had to make the ring gimbal larger as the size of the rocket engine is increased. The main problem encountered in the design of ring gimbals is that the yoke which transfers the rocket thrust force from the engine to the missile body must be made very heavy in order to work satisfactorily. More specifically, when the thrust load is applied it tends to bend the yoke which binds the radial bearings which are mounted between the yoke and the support members on the engine and the missile body. In order to prevent the bending load from bending the yoke and thereby bind the bearings it has been necessary to make the yoke much heavier with a more complicated structure. Therefore, such prior designs have not only added unwanted dead weight to the missile but also have increased the cost of such missiles.

With these disadvantages and problems in mind it is an object of this invention to provide a new, better yoke for a gimbal.

It is a further object of this invention to provide a lightweight yoke member for a gimbal which has a simple construction and will take larger loads more easily than prior yoke members.

A still further object of this invention is to provide a rocket engine ring gimbal which is so designed that the yoke of the ring gimbal will only be loaded in tension whereby no bending moments will be induced into the yoke, thus allowing a light weight yoke to be used without the danger of binding the bearings of the gimbal.

An additional object of this invention is to provide a rocket engine ring gimbal which is so designed that it is loaded more efficiently by the rocket engine thrust than prior rocket engine gimbals whereby a lighter gimbal may accomplish the desired results.

Other and further objects of this invention will become apparent in the detailed description below wherein.

Figure 1:
FIG. 1 is a drawing showing the general orientation of the present invention in relation to a missile and rocket engine.

Referring now to FIG. 1 which shows the general orientation of the present invention, it can be seen that a rocket engine 7 is mounted to a missile 8 by means of a gimbal indicated generally by the arrow 9. The gimbal 9 is preferably made up of a pair of missile body support members 10 mounted to the missile 8 and a pair of rocket engine support members 11 mounted to the engine 7; said support members being movably mounted together by means of a yoke member 12. A rotary actuator 13 is provided to rotate the rocket engine 7 relative to the missile body 8 about one axis in a manner which will be described in more detail below. A second rotary actuator (not shown) is located on the far side of the gimbal 9 to rotate the engine 7 relative to the missile body 8 about a second axis.

Figure 2:
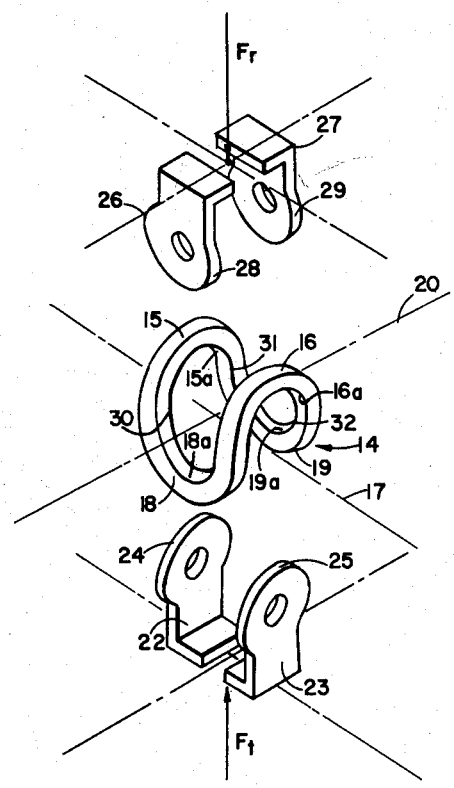
FIG. 2 is a drawing of the present gimbal illustrating the principle upon which the present invention depends.

As mentioned above the primary reason that the yoke members of previous ring gimbals had to be made so heavy is that they were so designed that bending stresses were introduced into the yoke when the rocket engine thrust was applied. FIG. 2 discloses a simplified yoke and support members in order to illustrate the principle upon which the present invention works and how the yoke member which carries the thrust forces from the rocket engine to the missile body is loaded only in tension. At the heart of the present invention is a continuous yoke or bar member 14 which is of nearly constant cross-section. The yoke member 14 is provided with a first semi-circular arcuate portion 15 and a second semi-circular arcuate portion 16 which are spaced along a first yoke axis 17, and also has a third semi-circular arcuate portion 18 and a fourth semi-circular arcuate portion 19 which are spaced along a second yoke axis 20 which extends at a right angle to the first yoke axis 17. As can be seen the ends of the first arcuate portion 15 are integrally joined to one of the ends of the third and fourth portions 18 and 19, respectively, while the end of the second portion 16 are integrally joined with the other of the ends of the third and fourth portions 18 and 19 respectively. Each of the arcuate portions 15, 16, 18 and 19 is provided with an inner semi-circular bearing surface designated as 15a, 16a, 18a, and 19a respectively. It should be noted that while it is preferred that the yoke member 14 be made from a single piece of metal in order to obtain a more efficient structure, the yoke member 14 could also be fabricated from several pieces of metal which are joined together by some suitable means to thereby form a continuous member as shown.

In order to transfer the thrust of the rocket engine, designated by the arrow $F_t$, to the yoke 14, a pair of engine support members 22 and 23 which would be mounted to a rocket engine (not shown) would preferably be used. The engine support members 22 and 23 have arcuate bearing surfaces 24 and 25 respectively which are forced against the lower bearing surfaces 15a and 16a of the arcuate portion 15 and 16 respectively by the force of the rocket engine. The bearing surfaces 24 and 25 extend for an angle of approximately 225° in order that the engine support members 22 and 23 may move relative to the yoke member 14. As mentioned above the force of the rocket engine thrust is passed from the gimbal yoke to the missile body by means of a pair of missile body support members. Therefore, in FIG. 2 a pair of simple missile body support members 26 and 27 are shown with arcuate bearing portions 28 and 29 respectively. These bearing surfaces 28 and 29 engage the semi-circular bearing surfaces 18a and 19a in order to transfer the reaction force $F_r$, due to the weight of the missile body 8 being accelerated, to the yoke member 14. Similar to the bearing surfaces 24 and 25, the bearing surfaces 28 and 29 extend for an angle of approximately 225° in order to allow the body support members 26 and 27 to be moved relative to the yoke member 14. It should be particularly noted that the inner bearing surfaces 15a and 16a are spaced apart along the yoke axis 17 a distance equal to the diameter of the inner bearing surfaces 18a and 19a. The bearing surfaces 18a and 19a are likewise spaced apart along the yoke axis 20 a distance equal to the diameter of the bearing surfaces 15a and 16a. With this construction the various semicircular bearing surfaces are tangent to each other at the ends of the various arcuate portions 15, 16, 18 and 19 which lie in a plane passing through the yoke axes 17 and 20. The points of tangency between bearing surfaces 15a and 18a, 15a and 19a, and 16a and 19a are designated as 30, 31 and 32 respectively. The point of tangency between bearing surfaces 16a and 18a can not be seen in FIG. 2. With this structure, when the yoke member 14 is loaded by the force of the rocket engine $F_t$ and the reaction force of the missile $F_r$ the yoke member will only be loaded in tension and will not tend to bend and thereby bind any bearing surfaces.

Figure 3:
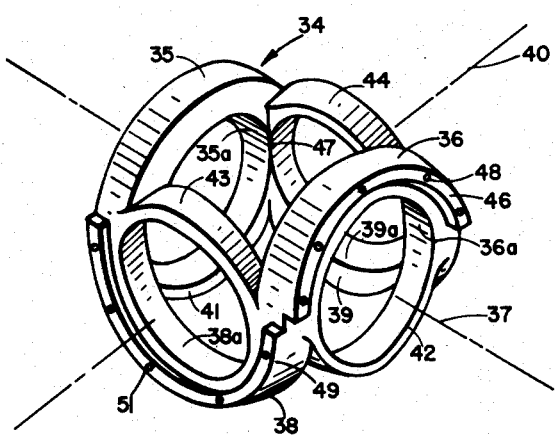
FIG. 3 is a pictorial view of the closed yoke of the present gimbal showing the details of its construction.

Although the yoke member 14 disclosed in FIG. 2 teaches the principle upon which the present invention operates well, a preferred embodiment of this invention includes additional structure and has a configuration as shown in FIG. 3. Here a continuous yoke or bar member 34 is shown which is basically the same as yoke member 14 in FIG. 2. More specifically, yoke member 34 is provided with a first and second semi-circular arcuate portion 35 and 36 spaced along a first yoke axis 37 and a third and fourth semicircular arcuate portion 38 and 39 respectively spaced along a second yoke axis 40 which extends at a right angle to the first yoke axis 37. Each of these arcuate portions 35, 36, 38 and 39 has an inner semi-circular bearing surface, designated as 35a, 36a, 38a, and 39a respectively, each of which is tangent to two of the other three bearing surfaces at the points, lying in a plane passing through the yoke axis, at which the various arcuate portions integrally join each other. When a missile is in position to be launched it is normal practice to support the missile and allow the rocket engine to hang below the missile by the particular gimbal system which is used. In order to support the weight of the rocket engine hanging below the missile, a series of lightweight arcuate portions 41, 42, 43, and 44 are located in opposite relation to the bearing surfaces 35a, 36a, 38a and 39a respectively. Liquid rocket engines normally only weight approximately 2 to 5% of the thrust that they will generate; therefore, each of the lightweight arcuate portions is preferably designed with a cross section, and therefore strength, which is approximately 5 to 10% of the bar member 34 when a rotary type positioning actuator is used to control the direction of engine thrust. If linear piston type actuators are used to position the rocket engine and thereby control the direction of thrust, the lightweight arcuate portions 41, 42, 43, and 44 are preferably made approximately 25% as strong as the bar member 34, since when positioning the engine the actuators sometimes tend to push the rocket engine away from the missile body with a force which is around 20% of the thrust of the engine.

Preferably the lightweight arcuate portions are provided on the gimbal in one of two ways. If the continuous bar yoke member 34 is manufactured of an endless bar member which is then bent into the proper shape shown, the lightweight arcuate portions are separately formed and then are welded to the proper location shown in FIG. 3. Alternatively, if the assembly is machined from a block of metal, the lightweight arcuate portions are formed in their respective proper location during the machining operation. In either case each of the lightweight arcuate portions 41 through 44 is preferably formed with its face which faces the respective opposing semi-circular bearing surface formed as a semi-circle. Such structure is preferred since it forms a circular aperture, the wall of which may easily receive and engage the outer race of a conventional radial roller bearing on an engine and body support member. Each of these circular apertures is tangent to two of the other three apertures. The point of tangency 47 between the bearing surfaces 35a and 39a is particularly well shown in FIG. 3.

An arcuate projection 46 is located on arcuate portion 36 with a series of threaded bores 48 formed therein to receive the mounting bolts by which a positioning actuator is mounted to the yoke member 34. Arcuate portion 38 is also provided with an arcuate projection 49 which has a series of threaded bores 51 formed therein to receive the mounting bolts by which another positioning actuator is mounted to said yoke member 34.

Figure 4:
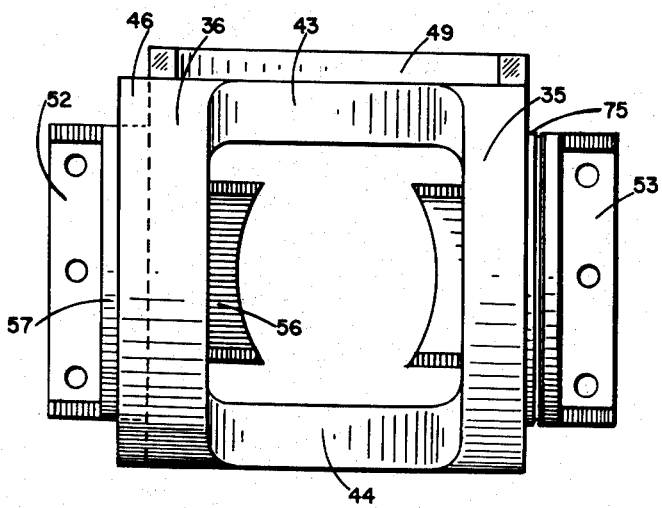
FIG. 4 is a view of the closed yoke shown in FIG. 3 as seen from above.

In the top view of the yoke member 34 shown in FIG. 4, it is seen that the various arcuate portions of the yoke member are joined to form a generally square shape with a hole passing down through the middle of the yoke in order to allow a propellant conduit to pass through the center of the gimbal. For purposes of clarity, only the engine support members and not the body support members are shown in FIG. 4.

Figure 5:
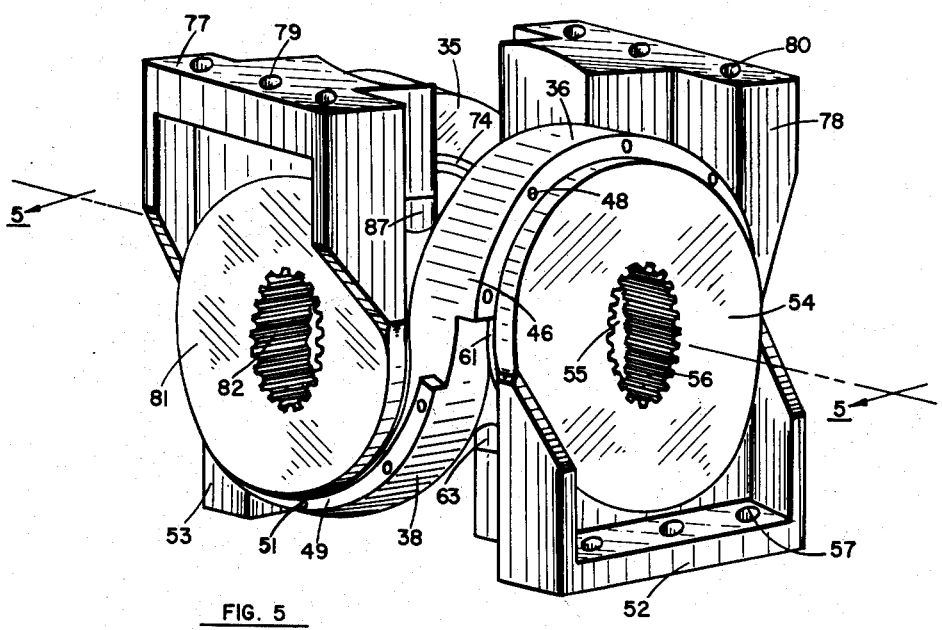
FIG. 5 is a pictorial view of the present gimbal with the missile body and the engine support members mounted to the closed yoke.

Referring now to FIG. 5 which is a pictorial view of the preferred embodiment of the yoke member 34 with means adapted to be mounted to a missile body and a rocket engine mounted to it. As shown, a first and a second engine support member 52 and 53 are mounted to the yoke member 34 to transfer loads from the thrust of the rocket engine (not shown). Engine support member 52 has a vertically extending upright portion 54 with a bore 55 therethrough; said bore having a plurality of splines 56 formed around the periphery thereof. A plurality of holes 57 are provided in the support member 52 in order to receive bolts by which the support member is mounted to the rocket engine. In order to reduce friction when the support members move relative to the yoke member 34 a series of bearings are used between the yoke and the various support members.

Figure 6:
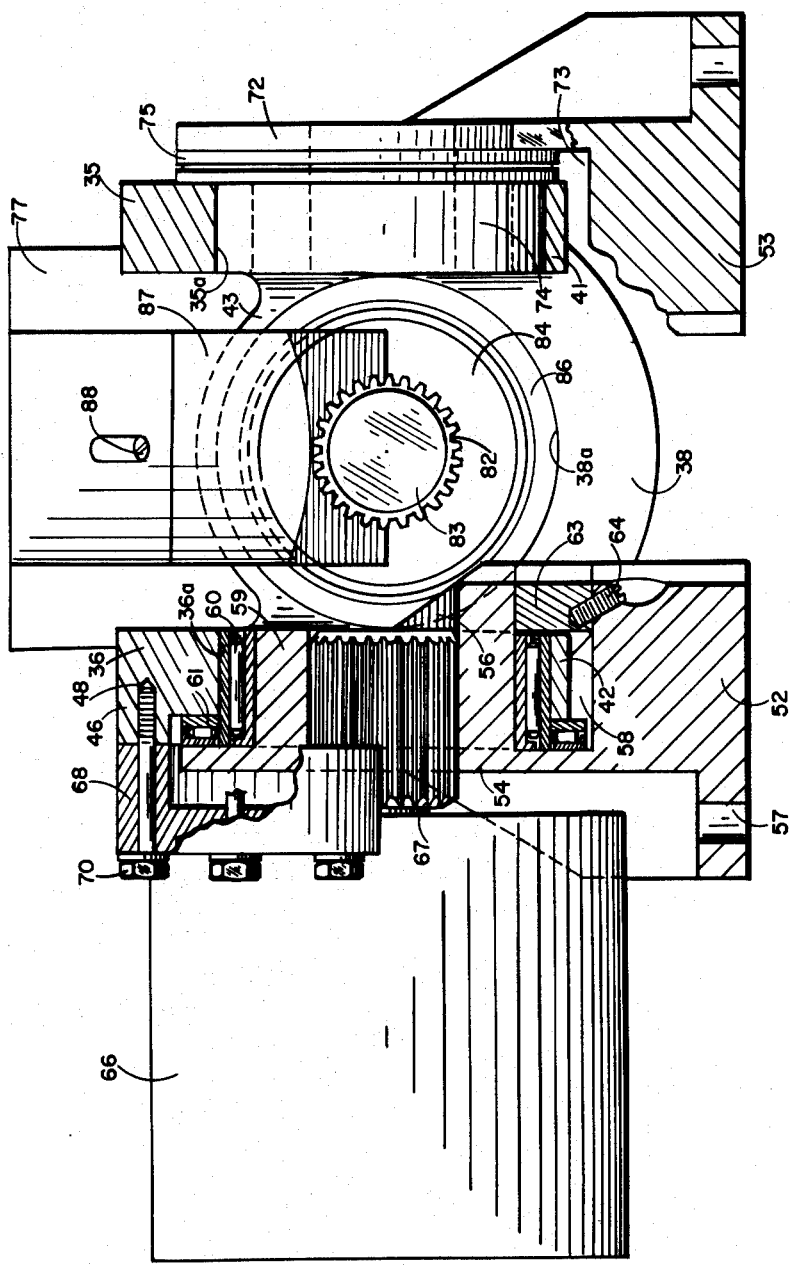
FIG. 6 is a partially cutaway view along line 5—5 showing the details of construction of the support members and the manner in which they engage the close yoke member.

The details of the construction of support member 52 and the bearings used in conjunction with it are disclosed in FIG. 6 wherein it can be seen that the upright portion 54 has a recess 58 therein, thereby forming an inwardly extending cylindrical portion 59. A radial roller bearing 60 is mounted with its inner race engaging the peripheral surface of cylindrical portion 59 and the upper half of its outer race engaging the bearing surfaces 36a in order to transfer the rocket thrust loads from the support member 52 to the yoke member 34 with a minimum of friction when the yoke member 34 s relative to the support member 52. The lower half of the outer race of the bearing 60 engages the upper surface of the lightweight arcuate portion 42 in order to transfer the dead weight of the engine to the yoke 34 when the missile is on the launch pad. A roller thrust bearing 61 is mounted to the radial bearing 60 by means of its right hand race which is brazed to the outer race of the radial roller bearing 60. The left hand and right hand races of the thrust bearing 61 engage the upright portion 54 and the side of the arcuate portions 36 and 42 respectively in order to transfer any lateral loads during operation. In order to furnish additional support for the cylindrical portion 59 a spacer block 63 is located in the recess 58 as shown and held there by means of a set screw 64.

Since the direction of the thrust of the engine may be varied in order to control the missile by rotating the engine support members 52 and 53 relative to the yoke member, means are provided to accomplish this and thereby steer the missile. In the present embodiment such means takes the form of a positioning rotary actuator 66 which is mounted with its rotatable splined shaft 67 engaging the splines 56 in the bore 55. An arcuate mounting flange 68 is provided on the housing of actuator 66 whereby the actuator is held to the yoke member 34 by means of a series of bolts 70 which are passed through bores in the flange 68 and threaded into the threaded bores 48.

The second engine support member 53 is very similar to engine support member 52 and has a vertically extending upright portion 72 having a recess 73 therein in order to form a cylindrical portion which is substantially the same as cylindrical portion 59 on support member 52 except that there are no splines formed in the bore through the cylindrical portion since no rotary actuator is attached to this side of the gimbal. The cylindrical portion of support member 53 is not shown since its structure is so similar to that of portion 59 and it is desired to show the details of the structure on the far side of the gimbal as shown in FIG. 5. A radial roller bearing 74 and a thrust roller bearing 75 are mounted in the same manner as bearings 60 and 61 mentioned above.

In order to transfer the rocket engine thrust loads to the missile body, a first and second body support member 77 and 78 are mounted to the missile body (not shown) by means of bolts (not shown) passing through a series of bores 79 and 80 in the two support members. In the preferred embodiment body support member 77 is substantially identical to engine support member 52 and has a vertically extending portion with a bore therein which has a series of splines 82 formed around the periphery thereof. A rotary actuator substantially the same as rotary actuator 66 is mounted to the arcuate flange 49 by means of bolts being threaded into the threaded bores 51 and has a splined rotatable shaft 83 which engages the splines 82 in order to rotate the yoke member 34 relative to the body support member 77 in the same manner that rotary actuator 66 does. The means of mounting this actuator is not shown since the actuator is substantially the same as rotary actuator 66. The vertically extending portion of support member 77 has been recessed in the same manner as the vertically extending portion 54 of support member 52 in order to form an inwardly extending cylindrical portion 84 which is substantially identical to cylindrical portion 59 of support 52. Around the periphery of the cylindrical portion 84 is mounted a radial roller bearing 86 which engages and transfers loads to the inner semi-circular bearing surface 38a of arcuate portion 38 and the lightweight arcuate portion 43 in the same manner that bearing 60 transfers loads arcuate portions 36 and 42. It should be noted that the outer race of bearing 86 is tangent to the far side of outer race of bearings 60 and 74 at the points at which the bearing surface 38a is tangent to the bearing surfaces 35a and 36a. A spacer block 87 which is substantially the same as spacer block 63 is mounted in the recess and held there by set screw 88 in order to give the cylindrical portion 84 additional support. The second body support member 78 is substantially the same as engine support member 53 and therefore will not be described in detail.

Although only one complete embodiment of the present invention has been shown and disclosed in detail it will be apparent to those skilled in the art that numerous modifications to this invention may be made without departing from the scope of the invention which should be limited only to the scope of the appended claims.

I claim:

1. In a universal gimbal: an endless bar member formed with a first and a second arcuate portion spaced along a first yoke axis, and third and fourth arcuate portions spaced along a second yoke axis which extends at a right angle to said first yoke axis, the ends of said first portion being integrally and directly joined to one of the ends of said third and fourth portions respectively, the ends of said second portion being integrally and directly joined to the other of the ends of said third and fourth portions respectively; four radial bearings each having an inner and an outer race, each of said bearings being mounted with its axis of rotation parallel to one of said yoke axes and its outer race engaging a separate one of said arcuate portions respectively, each of said outer races being tangent to two of the other three outer races at points lying in a plane passing through said two yoke axes and at which points said arcuate portions integrally join one another.

2. A universal rocket engine gimbal comprising: an engine support means, said means having a first and a second arcuate bearing surface axially spaced along a first yoke axis; body support means, a third and a fourth arcuate bearing surface located on said body support means axially spaced along a second yoke axis which extends at a right angle to said first yoke axis; and a gimbal yoke member, said yoke member having a first and a second arcuate bearing surface axially spaced along said first yoke axis and engaging said first and second bearing surfaces on said engine support means; said yoke having a third and a fourth arcuate bearing surface spaced along said second yoke axis and engaging said third and fourth bearing surfaces on said body support means; each of said first, second, third, and fourth bearing surface on said yoke member being tangent to two of the other three bearing surfaces.

3. In a universal rocket engine gimbal: a rocket engine support means, said means having a first and a second circular bearing surface axially spaced along a first yoke axis; a body support means, a third and a fourth circular bearing surface located on said body support means axially spaced along a second yoke axis which extends at a large angle to said first yoke axis; a gimbal yoke member formed of a continuous bar member of substantially constant cross section; said yoke having a first and a second semi-circular bearing surface axially spaced along said first yoke axis and engaging said first and second bearing surfaces on said engine support means; said yoke having a third and a fourth semi-circular bearing surface spaced along said second yoke axis and engaging said third and fourth bearing surfaces on said body support means; said first, second, third, and fourth bearing surfaces on said yoke member each being tangent to two of the other three bearing surfaces; means on said yoke to hold each of the support bearing surfaces against the respective yoke bearing surface, all points of said tangency lying in a plane common to all said points and said axes.

4. In a universal rocket engine gimbal: an endless yoke member formed with a first and a second arcuate portion spaced along a first yoke axis, and third and fourth arcuate portions spaced along a second yoke axis which extends at a right angle to said first yoke axis, the ends of said first portion being integrally and directly joined to one of the ends of said third and fourth portions respectively, the ends of said second portion being integrally and directly joined to the other of the ends of said third and fourth portions respectively; four radial bearings each having an inner and an outer race, each of said bearings being mounted with its axis of rotation upon one of said yoke axes and its outer race engaging a separate one of said arcuate portions respectively; each of said outer races being tangent to two of the other three outer races at points lying in a plane passing through the two yoke axes; means engaging said bearings to hold said bearings in engagement with the respective arcuate portions, rocket engine support member means adapted to be mounted to a rocket engine, said last mentioned means having surfaces engaging the inner race of the bearings which are mounted within said first and second arcuate portions; body support member means adapted to be mounted to a missile body, said last mentioned means having surfaces engaging the inner race of the bearings which are mounted within said third and fourth arcuate portions.

5. A yoke for a universal gimbal comprising an endless bar member of substantially constant cross section formed with a first and a second semi-circular portion spaced along a first yoke axis, and a third and a fourth semi-circular portion spaced along a second yoke axis which extends at a right angle to said first yoke axis, the ends of said first portion being integrally and directly joined to one of the ends of said third and fourth portions respectively, the ends of said second portion being integrally and directly joined to the other of the ends of said third and fourth portions respectively, each of said semi-circular portions having an inner semi-circular bearing surface facing and extending concentric to the respective yoke axis, each of said inner bearing surfaces being tangent to two of the other three bearing surfaces at a point lying in a plane extending through the two yoke axes.

6. A yoke for a universal gimbal comprising an endless bar member of substantially constant cross section formed with a first and a second semi-circular portion spaced along a first yoke axis, and a third and a fourth semi-circular portion spaced along a second yoke axis which extends at a right angle to said first yoke axis, the ends of said first portion being integrally and directly joined to one of the ends of said third and fourth portions respectively, the ends of said second portion being integrally and directly joined to the other of the ends of said third and fourth portions respectively, each of said semi-circular portions having an inner semi-circular bearing surface facing and extending concentric to the respective yoke axis, each of said inner bearing surfaces being tangent to two of the other three bearing surfaces at a point lying in a plane extending through the two yoke axes; and a light weight arcuate portion located in opposed relation to each of said semi-circular portions, said light weight arcuate portions each having an inner face of semi-circular shape forming with each of said semi-circular bearing surfaces a continuous bearing surface surrounding an aperture adapted to receive the outer race of a bearing.

References Cited in the file of this patent
UNITED STATES PATENTS

| | | |
|---|---|---|
| 896,195 | Bogart | Aug. 18, 1908 |
| 1,381,600 | Thiemer | June 14, 1921 |
| 2,336,579 | Venditty et al. | Dec. 14, 1943 |
| 2,396,658 | Goddard | Mar. 12, 1946 |
| 2,621,871 | Robert | Dec. 16, 1952 |
| 2,865,579 | Caillette | Dec. 23, 1958 |